United States Patent
Schulz

(10) Patent No.: US 8,974,123 B2
(45) Date of Patent: Mar. 10, 2015

(54) ROLLING-ELEMENT BEARING CAGE AND METHOD FOR PRODUCING A ROLLING-ELEMENT BEARING CAGE

(75) Inventor: Alexander Schulz, Schweinfurt (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/005,945

(22) PCT Filed: Mar. 26, 2012

(86) PCT No.: PCT/EP2012/055299
§ 371 (c)(1),
(2), (4) Date: Sep. 18, 2013

(87) PCT Pub. No.: WO2012/130791
PCT Pub. Date: Oct. 4, 2012

(65) Prior Publication Data
US 2014/0003757 A1    Jan. 2, 2014

(30) Foreign Application Priority Data
Mar. 31, 2011    (DE) .................... 10 2011 006 467

(51) Int. Cl.
F16C 33/46    (2006.01)
B23C 3/02    (2006.01)
F16C 19/36    (2006.01)

(52) U.S. Cl.
CPC .............. *B23C 3/02* (2013.01); *F16C 33/4623* (2013.01); *F16C 33/467* (2013.01); *F16C 19/364* (2013.01); *F16C 2220/66* (2013.01)
USPC ......................................... 384/572

(58) Field of Classification Search
CPC .. F16C 33/467; F16C 33/4623; F16C 19/364; B23C 3/02
USPC ................... 384/572, 575, 576, 580
See application file for complete search history.

(56) References Cited

U.S. PATENT DOCUMENTS 2,327,237 A * 8/1943 Baden ............... 29/898.067
6,955,476 B1 10/2005 Murai
7,931,410 B2 * 4/2011 Tsumori et al. ............ 384/572
(Continued)

FOREIGN PATENT DOCUMENTS

DE        10021089        2/2001
DE    102006006146    10/2007
(Continued)

*Primary Examiner* — Thomas R. Hannon
(74) *Attorney, Agent, or Firm* — Volpe and Koenig, P.C.

(57) ABSTRACT

A rolling-element bearing cage (12) having two lateral rings (2) and a plurality of cage webs (1), wherein the laterals rings (2) and the cage webs (1) form a plurality of cage pockets (8). In order for the rolling-element bearing cage (12) to have an especially light and stable design, a respective recess (3) is formed in each of the corners (10) of the cage pockets (8). This recess is tapered or reduced toward the radial center (7) of the recess without forming a running surface for the associated rolling element (9). A method for producing the rolling-element bearing cage (12) is also provided, wherein a plurality of cage pockets (8) are milled into a solid cage blank, wherein the corners (10) of the cage pockets (8) are milled in such a way that a respective recess (3) is formed in each of the corners of the cage pockets, which recess is tapered or reduced toward the radial center (7) of the recess without forming a running surface for the associated rolling element (9).

14 Claims, 5 Drawing Sheets

(56) References Cited

U.S. PATENT DOCUMENTS

| | | | |
|---|---|---|---|
| 8,348,514 B2* | 1/2013 | Schweitzer | 384/579 |
| 2003/0068110 A1* | 4/2003 | Matsui et al. | 384/572 |
| 2010/0310203 A1 | 12/2010 | Fandre et al. | |

FOREIGN PATENT DOCUMENTS

| | | |
|---|---|---|
| DE | 102007057550 | 6/2009 |
| JP | 2000087972 | 3/2000 |
| JP | 2002235752 | 8/2002 |

* cited by examiner

ROLLING-ELEMENT BEARING CAGE AND METHOD FOR PRODUCING A ROLLING-ELEMENT BEARING CAGE

FIELD OF THE INVENTION

The invention relates to a rolling-element bearing cage with two lateral rings and a plurality of cage webs, wherein the lateral rings and the cage webs form a plurality of cage pockets. The invention also relates to a method for producing such a rolling-element bearing cage.

BACKGROUND

Rolling-element bearing cages according to the class, for example, for tapered roller bearings, are produced from a ring-shaped cage blank in which the contours for the cage pockets are milled. The contours of the cage pockets are to a large extent defined by the type and size of the rolling-element bodies being used. For tapered or cylindrical rolling-element bodies, the cage pockets have essentially rectangular contours. Recesses that prevent the rolling-element bodies from contacting the corners of the cage pockets are typically milled into the corners of the cage pockets. In DE 100 21 089 B4, for example, a cage is described for a rolling-element bearing in which an escape recess is provided in each corner of the cage pockets.

It is known that the cage pockets of the milled solid cages are produced with dovetail milling. Such processing, however, requires relief milling as an outlet for the cage pocket. A disadvantage in such relief milling is that this relief milling mechanically weakens the cage web at the transition to the side edge or to the lateral ring.

From DE 10 2006 006 146 B3, a method for milling a solid cage for a rolling-element bearing is also known in which undercut lines for the rolling-element bodies are produced in the corners of the cage pockets with a drilling or milling tool.

The invention is based on the objective of providing a rolling-element bearing cage for a roller bearing in which the recesses in the cage pockets weaken the stability of the cage webs less than previously typical.

SUMMARY

The invention is based on the knowledge that by changing the geometric shape of the corners of the cage pockets, the stability of the cage webs and thus of the cage can be increased, without negatively affecting its function, namely preventing the contact of the rolling-element bodies.

The invention starts from a rolling-element bearing cage according to the class with two lateral rings and a plurality of cage webs, wherein the lateral rings and the cage webs form a plurality of cage pockets. In order to mechanically weaken this rolling-element bearing cage in the region of the pocket corners as little as possible, it is also provided according to the invention that a recess is formed in each of the corners of the cage pockets, wherein this recess tapers or becomes smaller towards its radial center, without forming a contact surface for the associated rolling-element bodies.

Through this construction of the pocket corners, an unnecessarily large amount of material is no longer removed as previously required in the connection area of the cage webs to the lateral rings of the cage, so that this area that is especially critical for the mechanical properties is, on one hand, constructed comparatively more stable than previously and, on the other hand, it nevertheless has a recess that is large enough to reliably prevent contact of the axial end-side corners of the rolling-element bodies.

The cage webs of the rolling-element bearing cage according to the invention are constructed in the area of their transition to each lateral ring, that is, where the cage pockets have rounded corners, so that, on one hand, a contact of the ends of the rolling-element bodies is reliably prevented and, on the other hand, the cage structure is mechanically weakened as little as possible by the construction of the rounded corners. This produces the possibility of forming narrower webs for an equivalent mechanical stability of these webs of the rolling-element bearing cage, wherein a larger number of rolling-element body pockets can be arranged in the cage. Consequently, more rolling-element bodies can be held in the rolling-element bearing that in a conventional construction of the cage, wherein ultimately the load bearing capacity of the rolling-element bearing is increased for an equivalent diameter.

Preferably it is provided that the tapering of the recess of the pocket corners is formed both in the peripheral direction and also in the axial direction of the cage. In this way, for the production of the cage, a particularly small amount of cage material is removed in the area of the pocket corners.

According to another refinement, it is provided that the pocket corners are formed with an approximately elliptical or partially stadium-like shape seen in a top view from the radial outside to the radial inside. Here, the area at which each cage web is connected to the lateral ring of the cage has an approximately semicircular shape, so that the axial end-side edge of a roller-shaped rolling-element body is allowed a sufficient clearance.

Advantageously, a cage constructed according to the invention is formed with its lateral rings and cage webs as a solid cage and is produced from one piece. However, it is also possible to assemble such a rolling-element bearing cage from individual parts.

According to another feature of the invention, it is provided that the radially outer side of the cage webs is wider seen in the circumferential direction of the cage than its radially inner side. In this way it is taken into account that roller-shaped rolling-element bodies are held in the cage pockets with only a part of their diameter.

One refinement of the structural feature just mentioned defines that each of the sides in the circumferential direction in the cage webs has two sections that are angled relative to each other. Through this construction, the cage webs are also formed as stable as possible, wherein only the radial inner section of these side surfaces is adapted to the geometry of the rolling-element bodies being used.

In this context, it is considered advantageous if the sections that were just mentioned and are angled relative to each other in the sides in the circumferential direction in the cage webs bound each other at an angle a of 120° to 170°. An angle a of 150° appears to be especially suitable.

In addition, it is advantageous when it is provided that the radially inner side of each cage web is bound with the radially outer adjacent section of the sides in the circumferential direction in the cage webs at an angle b of 100° to 150°. An angle b of 125° appears to be especially suitable.

Finally, in this context it is preferably provided that the radially outer side of each cage web is bound with the radially inner adjacent section of the sides in the circumferential direction in the cage web at an angle c of 80° to 90° relative to each other. An angle c of 80° appears to be especially suitable.

Another advantageous geometric feature of a cage formed according to the invention is when the radially inner section in the peripheral direction in the sides of each cage web is oriented at an angle d of 20° to 40° relative to a straight line that is oriented parallel to the surface normal of the radially inner side of the cage web.

The invention also relates to a method for producing a rolling-element bearing cage with at least some of the features mentioned above. Here it is provided that for producing such a cage, a plurality of cage pockets are milled in a solid cage blank, wherein the corners of the cage pocket are milled such that, in each pocket, a recess is formed that tapers or becomes smaller towards its radial center, without forming a contact surface for the associated rolling-element body.

Here it can be preferably provided that the recess of the pocket corners are milled so that the mentioned tapering of the recess is formed both in the circumferential direction and also in the axial direction of the cage.

Through the described formation of the recesses in the corners of the cage pockets, the stability of the cage webs is maintained, without negatively affecting their function, namely preventing an undesired contact of the rolling-element body rollers on the corners of the cage pockets.

The milling is advantageously performed with a multi-axis milling machine (NC multi-axis milling machine), wherein the shape of the pocket corners is optimized and the production costs are reduced.

BRIEF DESCRIPTION OF THE DRAWINGS

The invention is explained in more detail below with reference to an embodiment shown in a drawing. Shown herein are.

DETAILED DESCRIPTION OF THE PREFERRED EMBODIMENTS

Figure 1:
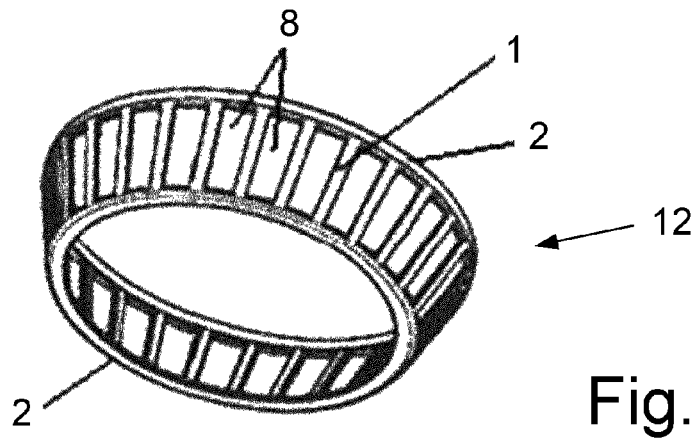
FIG. 1 a perspective view of a cage according to the invention for a tapered roller bearing, FIG. 2 a longitudinal section through the cage according to FIG. 1 with a top view of a cage pocket and a tapered rolling-element bearing, FIG. 3 a cross sectional view A-B through a web of the cage according to FIG. 2 with a top view of a lateral ring and the pocket corners formed there according to the invention, FIG. 4 a perspective partial view of a lateral ring of the cage according to FIG. 2 with cage webs and pocket corners according to the invention, FIG. 5 a cross sectional view A-B according to FIG. 2 through a cage web with the profile angles of its peripheral faces marked, FIG. 6 a cross sectional view through a cage web with adjacent tapered rollers, FIG. 7 a cross sectional view E-F through a tapered roller with adjacent cage webs, FIG. 8 a top view of a cage pocket of the cage according to FIG. 2, FIG. 9 a three-dimensional representation of a rolling-element bearing cage according to the invention in a half longitudinal section, and FIG. 10 a perspective view of the cage according to FIG. 2 in the region of the pocket corners with a viewing direction from the radial inside to the radial outside.

FIG. 1 shows accordingly a rolling-element bearing cage 12 that is formed according to the invention and was milled from a solid annular part. For this purpose, a multi-axis milling machine was used that milled the cage pockets 8, so that two lateral rings 2 are connected rigidly to each other by a plurality of cage webs 1.

Figure 2:
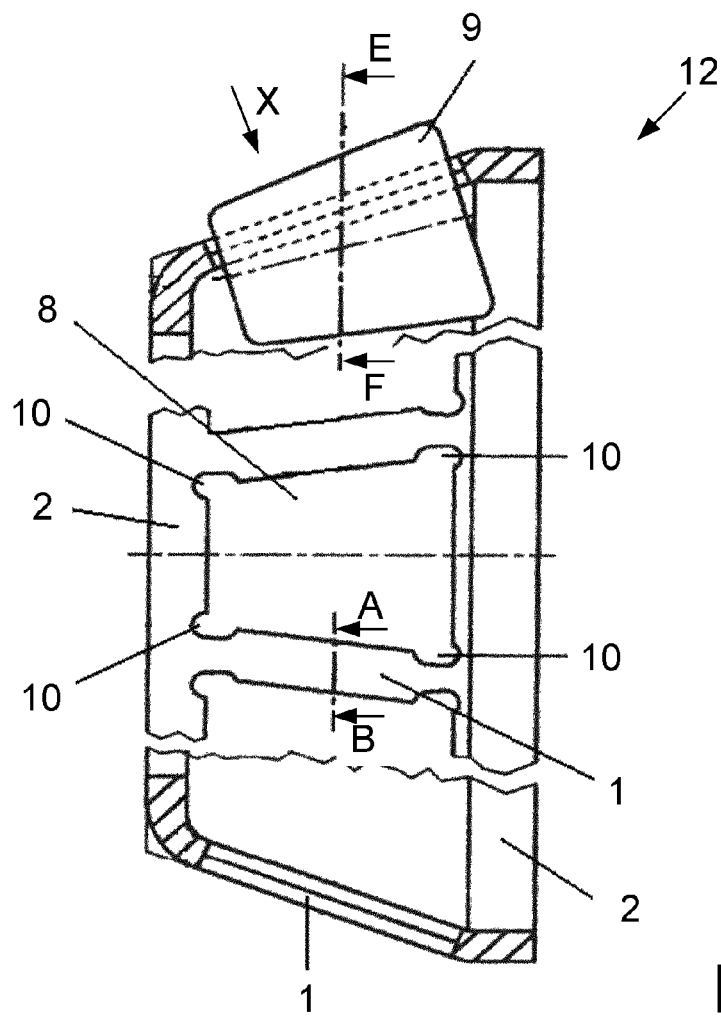

The rolling-element bearing cage 12 can be seen clearly in FIG. 2 in a longitudinal section view. A tapered rolling-element body 9 that penetrates into the cage pocket 8 in a known way with only one part of its diameter is inserted into a cage pocket 8. The cage pocket 8 that can be seen completely in a view X has, in the region in which the cage webs 1 are connected to the two lateral rings 2, pocket corners 10 that can be seen to be formed with a partially elliptical or stadium-like shape. These pocket corners 10 are formed and constructed, above all, in the radial direction, so that the rolling-element bodies held in a cage pocket 8 do not contact against the cage 12 with their axially end-side edges.

Figure 3:
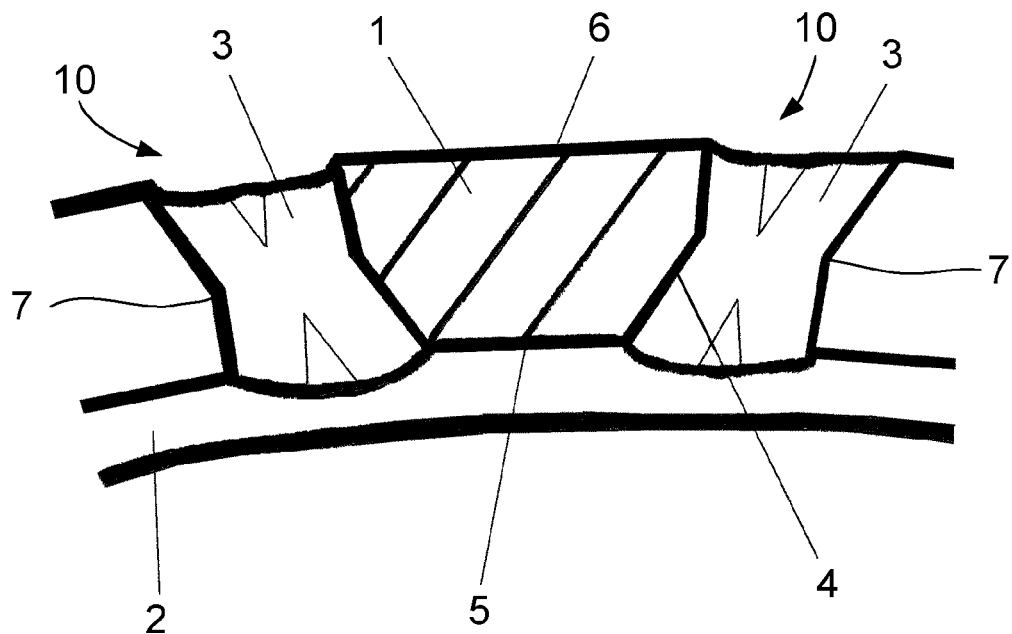
Figure 4:
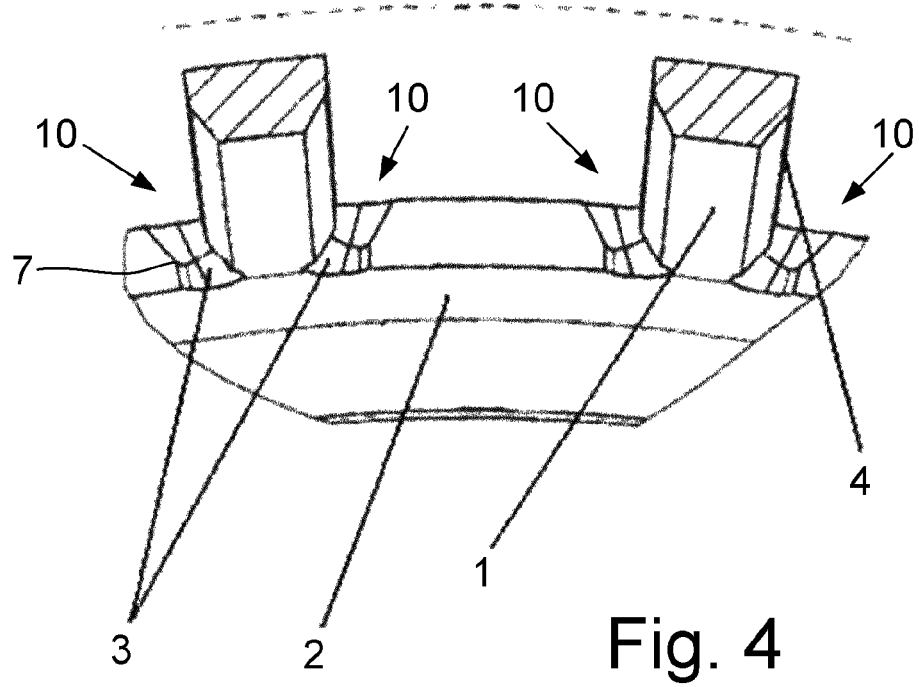
Figure 5:
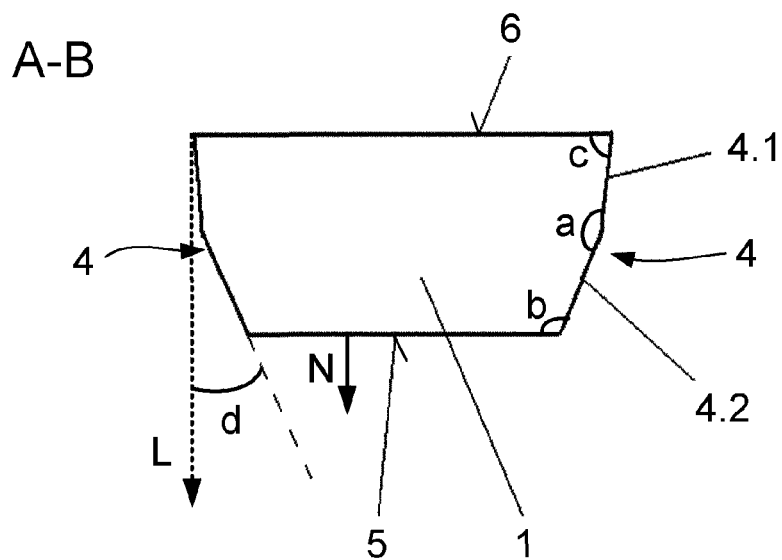
Figure 6:
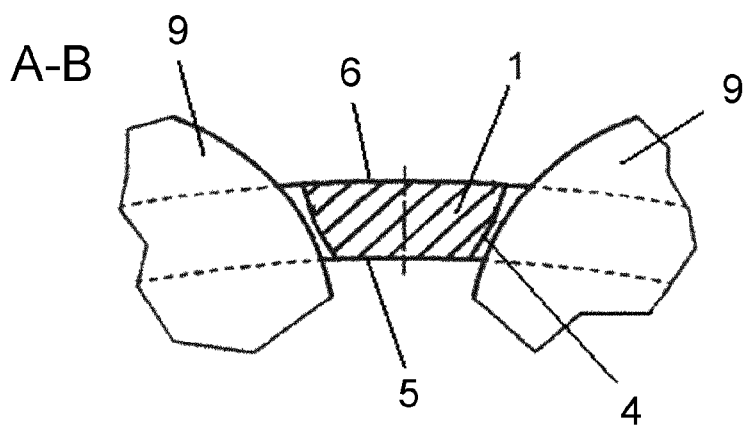
Figure 7:
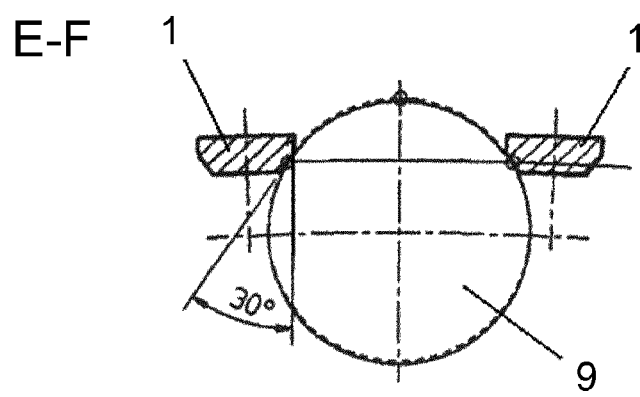
Figure 8:
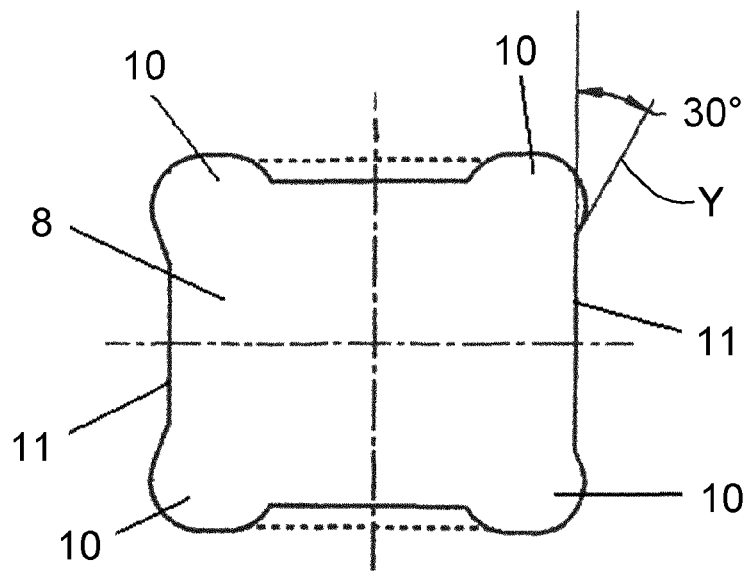
Figure 9:
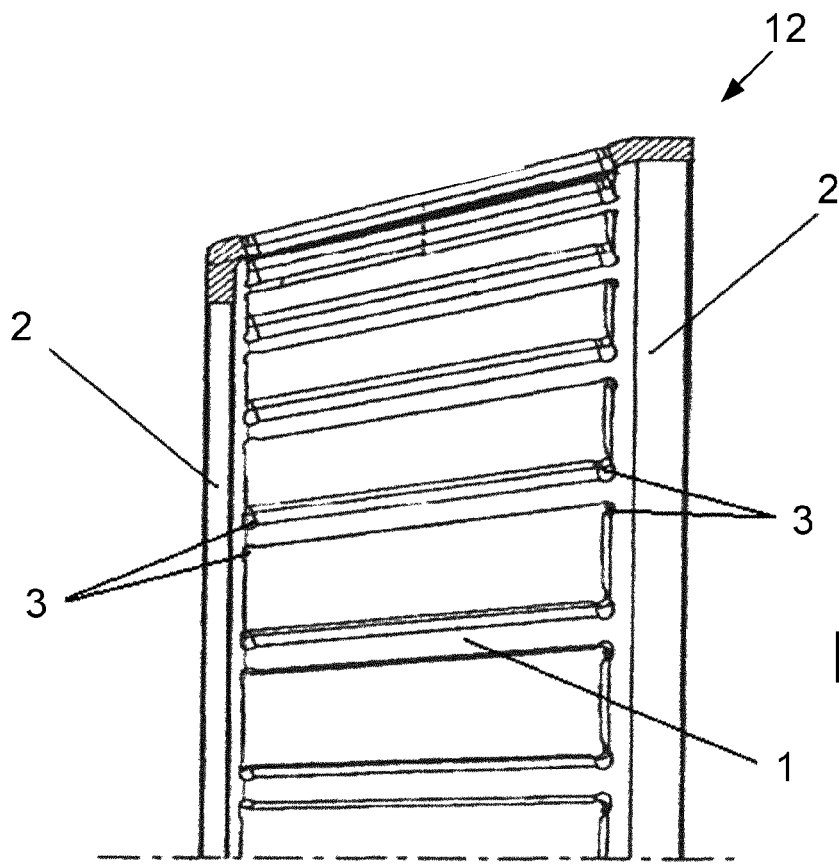

The particular construction of the pocket corners 10 can be seen especially well in FIGS. 3 and 4. In the axial top view shown in FIG. 3 of a lateral ring 2 of the cage 12 from the axial inside to the axial outside can be seen clearly that the pocket corners 10 have a new and unusual geometry. Thus it is provided that a recess 3 is formed in each of the pocket corners 10, wherein this recess tapers towards its radial center 7, without providing a contact surface for the associated rolling-element bodies 9. In other words, the pocket corners 10 are formed so that the space generated by the recesses 3 expand radially outward and radially inward starting from their radial center 7.

FIGS. 3 and 4 also clearly show that the tapering of the recesses 3 of the pocket corners 10 is also formed in the axial direction of the cage 12. This means that the recesses 3 of the pocket corners 10 are less deep in the region of their radial center 7 than the radially inside and radially outside.

FIGS. 3 and 4, as well as FIGS. 5 to 7 and 9 to 10 show, according to the views A-B and E-F of FIG. 2, that the cross-sectional geometry of the cage webs 1 is adapted to the geometry of the recesses 3 of the cage pockets 12. Thus, the cage webs 1 have an approximately trapezoidal geometry in cross section, with a radially inner side 5, a radially inner side 6, and two lateral surfaces 4 in the circumferential direction of the cage. The radially inner side 5 of the cage webs 1 is here shorter than the radially outer side 6 due to the fact that the diameter of the rolling-element bodies 9 held only partially in the cage pockets 8 in the radial direction increases radially inwardly.

The two lateral surfaces 4 have the special feature that they are each divided into two sections 4.1 and 4.2 that are angled relative to each other. According to the illustrated embodiment, it is here provided that these sections 4.1, 4.2 bound each other at an angle a of 120° to 170°. It can be further seen in the figures that the radially inner side 5 of each cage web 1 is bounded with the radially outer adjacent section 4.2 of the sides 4 in the circumferential direction at an angle b of 100° to 150°. Finally, the shown cage web 1 is formed so that the radially inner section 4.2 of the sides 4 in the circumferential direction in the cage web 1 is oriented at an angle d of 20° to 40° relative to a straight line L that is oriented parallel to the surface normal N of the radially inner side 5 of the cage web 1. Through these geometries with angle relationships, the cage webs 1 also have an optimal mechanical strength for the specified dimensions of the cage pockets 8.

Figure 10:
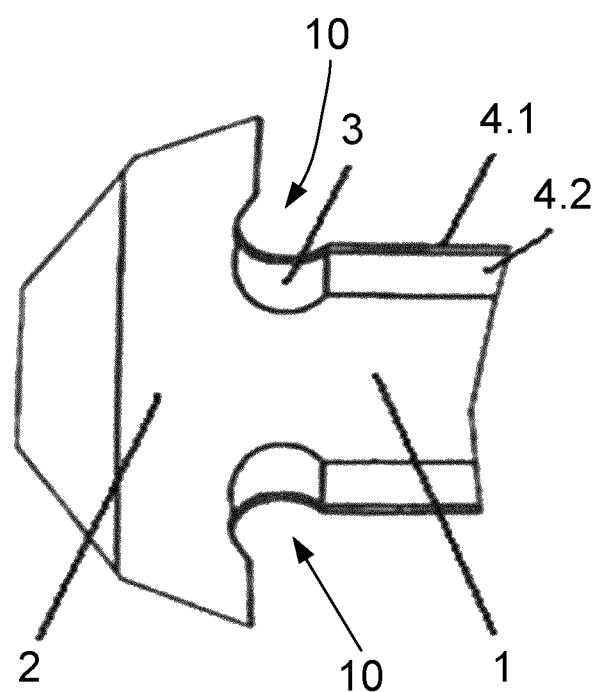

Finally, with reference to FIG. 10 it should be noted that the pocket corners 10 are milled to a round shape on their axial ends, wherein a tangent Y to the rounded sections of the pocket corners 10 assumes an angle of 30° relative to the end-side edges 11 of the cage pockets 8.

LIST OF REFERENCE NUMBERS

1 Cage web
2 Lateral ring

3 Recess in the pocket corner
4 Lateral face
4.1 Radially outer section of the lateral face 4
4.2 Radially inner section of the lateral face 4
5 Radially inner side of the cage webs
6 Radially outer side of the cage webs
7 Radial center of the recess 3
8 Cage pocket
9 Tapered roller
10 Pocket corner
11 End-side edge of the pocket corner
12 Rolling-element bearing cage
L Straight line
N Surface normal
X Viewing direction
Y Tangent

The invention claimed is:

1. Rolling-element bearing cage comprising two lateral rings and a plurality of cage webs, the lateral rings and the cage webs form a plurality of cage pockets, each having corners, a recess is formed in each of the corners of the cage pockets, and the recesses taper towards a radial center thereof, without forming a running surface for the associated rolling-element body.

2. Rolling-element bearing cage according to claim 1, wherein the tapering of the recess of the pocket corners is formed both in a peripheral direction and also in an axial direction of the cage.

3. Rolling-element bearing cage according to claim 1, wherein in a top view from radially outside to radially inside, the pocket corners are formed approximately with an elliptical or stadium-like shape.

4. Rolling-element bearing cage according to claim 1, wherein the cage including the lateral rings and the cage webs is formed as a unitary piece.

5. Rolling-element bearing cage according to claim 1, wherein a radially outer side of the cage webs is formed wider in a circumferential direction of the cage than a radially inner side.

6. Rolling-element bearing cage according to claim 1, wherein sides of the cage webs in a circumferential direction each have two sections angled toward each other.

7. Rolling-element bearing cage according to claim 6, wherein the sections angled toward each other of the sides of the cage webs bound each other at an angle (a) of 120° to 170°.

8. Rolling-element bearing cage according to claim 6, wherein a radially inner side of each of the cage webs extend to a radially outer adjacent one of the sections of the sides in the circumferential direction at an angle (b) of 100° to 150°.

9. Rolling-element bearing cage according to claim 6, wherein the radially outer side of each of the cage webs extend to a radially inner adjacent one of the sections of the sides in the circumferential direction at an angle (c) of 80° to 90°.

10. Rolling-element bearing cage according to claim 6, wherein a radially inner one of the sections of the sides in the circumferential direction in each of the cage webs is oriented at an angle (d)=20° to 40° relative to a straight line (L) that is oriented parallel to a surface normal (N) of a radially inner side of the cage web.

11. Method for producing a rolling-element bearing cage according to claim 1, comprising milling a plurality of cage pockets in a solid cage blank, the corners of the cage pockets are milled such that, in each of the corners, a recess is formed that tapers towards a radial center, without forming a running surface for an associated rolling-element body.

12. Method according to claim 11, wherein the recess of the pockets corners are milled so that the tapers are formed both in a peripheral direction and also in an axial direction of the cage.

13. Method according to claim 11, wherein the pocket corners are milled so that these are formed approximately in an elliptical or stadium-like shape from the radial outside to the radial inside.

14. Method according to claim 11, wherein the milling is performed with a multi-axis milling machine.

* * * * *